(12) United States Patent
Fegely et al.

(10) Patent No.: US 9,964,960 B2
(45) Date of Patent: May 8, 2018

(54) HOVER ATTITUDE TRIM FOR VEHICLE

(71) Applicant: Sikorsky Aircraft Corporation, Stratford, CT (US)

(72) Inventors: Cody Fegely, Milford, CT (US); Stephen Kubik, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days. days.

(21) Appl. No.: 15/185,809

(22) Filed: Jun. 17, 2016

(65) Prior Publication Data

US 2017/0097644 A1 Apr. 6, 2017

Related U.S. Application Data

(60) Provisional application No. 62/207,180, filed on Aug. 19, 2015.

(51) Int. Cl.
| | |
|---|---|
| *G05D 1/06* | (2006.01) |
| *G05D 1/08* | (2006.01) |
| *B64C 13/18* | (2006.01) |
| *B64C 29/02* | (2006.01) |

(52) U.S. Cl.
CPC ........... *G05D 1/0676* (2013.01); *B64C 13/18* (2013.01); *B64C 29/02* (2013.01); *G05D 1/0623* (2013.01); *G05D 1/0858* (2013.01)

(58) Field of Classification Search
CPC .. G05D 1/0676; G05D 1/0623; G05D 1/0858; B64C 13/18; B64C 29/02
See application file for complete search history.

(56) References Cited

U.S. PATENT DOCUMENTS

| | | | |
|---|---|---|---|
| 4,029,271 A | 6/1977 | Murphy et al. | |
| 5,863,013 A * | 1/1999 | Schmittle | B64C 3/385 244/104 LS |
| 6,648,269 B2 | 11/2003 | Gold et al. | |
| 7,617,024 B2 | 11/2009 | Builta | |
| 8,219,267 B2 | 7/2012 | Hamke et al. | |
| 2007/0215746 A1* | 9/2007 | Rieken | B64C 39/06 244/6 |
| 2012/0299753 A1* | 11/2012 | Thoreen | G01C 23/005 340/975 |
| 2015/0331420 A1* | 11/2015 | Chubb | B64C 39/022 701/7 |
| 2015/0375851 A1* | 12/2015 | Salesse-Lavergne | G05D 1/0858 244/17.13 |
| 2016/0347467 A1* | 12/2016 | Salesse-Lavergne | B64C 13/04 |
| 2016/0368605 A1* | 12/2016 | Behrens | F16M 13/02 |
| 2016/0378121 A1* | 12/2016 | Shue | G05D 1/105 701/7 |

* cited by examiner

*Primary Examiner* — Rami Khatib
(74) *Attorney, Agent, or Firm* — Cantor Colburn LLP

(57) ABSTRACT

A vertical take-off and landing (VTOL) aircraft is provided and includes a fuselage, wings extending outwardly from the fuselage to define a wing plane and a prop-rotor operably disposed to generate thrust, a flight computer and controllable surfaces disposed on at least one of the fuselage, the wings and the prop-rotor. The controllable surfaces are controllable by the flight computer to position the wing plane in accordance with a predominant local wind direction.

12 Claims, 4 Drawing Sheets

US 9,964,960 B2

HOVER ATTITUDE TRIM FOR VEHICLE

CROSS-REFERENCE TO RELATED APPLICATION

This is a non-provisional application that claims the benefit of priority to provisional application No. 62/207,180, which was filed on Aug. 19, 2015. The entire contents of provisional application No. 62/207,180 are incorporated herein by reference.

FEDERAL RESEARCH STATEMENT

This invention was made with government support with the DARPA under Contract No. HR0011-14-C-0010. The government therefore has certain rights in this invention.

BACKGROUND OF THE DISCLOSURE

The subject matter disclosed herein relates to a hover attitude trim method and, more particularly, to the use of a hover attitude trim method for an autonomous vehicle, such as an aircraft, in windy conditions.

Vertical take-off and landing (VTOL) aircraft may include helicopters or tail sitters. In the latter case, a tail sitter VTOL typically has a fuselage with a nose cone section and a trailing section, wings extending outwardly from the fuselage, an engine supported on the fuselage or the wings to generate thrust and, in some cases, various controllable aerodynamic surfaces. The generation of thrust by the engine in concert with the movement of the controllable aerodynamic surfaces allows the VTOL aircraft to take-off and land vertically and to perform forward horizontal flight. VTOL aircraft may be manned or unmanned and, in the latter case, may be piloted or autonomous.

Piloted vertical take-off and landing (VTOL) aircraft will typically be oriented by an operator based on an operational envelope and a desirable aircraft trim attitude. Thus, for a piloted VTOL aircraft where the operator identifies when an unfavorable or high risk landing attempt is in effect by reference to appropriate sensor suites (e.g., a multi-directional low speed air data system) or by derivation of the condition algorithmically, the condition can be mitigated or avoided by the operator via inputted operator commands. By contrast, autonomous VTOL aircraft may not always be capable of understanding that an unfavorable or high risk landing attempt is in effect and as a result may not take action to mitigate or avoid the condition.

BRIEF DESCRIPTION OF THE DISCLOSURE

According to one aspect of the disclosure, a vertical take-off and landing (VTOL) aircraft is provided and includes a fuselage, wings extending outwardly from the fuselage to define a wing plane and a prop-rotor operably disposed to generate thrust, a flight computer and controllable surfaces disposed on at least one of the fuselage, the wings and the prop-rotor. The controllable surfaces are controllable by the flight computer to position the wing plane in accordance with a predominant local wind direction.

In accordance with additional or alternative embodiments, the flight computer is configured for executing autonomous flight control.

In accordance with additional or alternative embodiments, the VTOL aircraft further includes alighting elements on which the VTOL aircraft sits in a grounded condition and alighting element dampening assemblies by which the alighting elements are coupled with the wings.

In accordance with additional or alternative embodiments, the wings extend outwardly from opposite sides of the fuselage and the prop-rotor includes a first prop-rotor operably disposed on one of the wings and a second prop-rotor operably disposed on the other of the wings.

In accordance with additional or alternative embodiments, the flight computer has access to a differential value between target and actual pitch attitudes of the wing plane and state data associating the differential value with predominant local wind conditions.

In accordance with additional or alternative embodiments, the controllable surfaces include cyclically controllable prop-rotor blades and at least one of spoilers, flaps and ailerons.

In accordance with additional or alternative embodiments, the flight computer controls the cyclically controllable prop-rotor blades to turn the wing plane toward an alignment condition and the at least one of the spoilers, flaps and ailerons to decrease the differential value.

In accordance with additional or alternative embodiments, the controllable surfaces are controllable by the flight computer to orient the wing plane to align with the predominant local wind direction.

In accordance with additional or alternative embodiments, the controllable surfaces are controllable by the flight computer to compensate for the predominant local wind direction.

In accordance with additional or alternative embodiments, the controllable surfaces are controllable by the flight computer to orient the wing plane to assume an angle within a range of predefined angles with respect to a predominant local wind direction.

According to yet another aspect of the disclosure, a method of controlling a vertical take-off and landing (VTOL) aircraft is provided. The VTOL aircraft includes a fuselage, wings extending outwardly from the fuselage to define a wing plane and a prop-rotor operably disposed to generate thrust. The method includes determining a differential value between target and actual pitch attitudes of the wing plane, establishing a range of trim angles of the wing plane relative to predominant local wind conditions in accordance with the differential value and orienting the wing plane to assume a trim angle within the range of the trim angles.

In accordance with additional or alternative embodiments, the method further includes autonomously controlling a flight of the VTOL aircraft.

In accordance with additional or alternative embodiments, the establishing of the range of the trim angles includes associating the differential value with the predominant local wind conditions.

In accordance with additional or alternative embodiments, the orienting includes cyclically controlling prop-rotor blades of the prop-rotor.

In accordance with additional or alternative embodiments, the method further includes decreasing the differential value by controlling controllable surfaces and increasing the range of the trim angles in accordance with the decreasing of the differential value.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, an autonomous VTOL aircraft is provided that is capable of understanding that an unfavorable or high risk landing attempt is in effect and thus takes action to mitigate or avoid the condition. This action is designed to obtain an optimal hover attitude for VTOL aircraft landing and includes a reorientation of the VTOL aircraft to minimize a pitch attitude variation from vertical and a reference to a lookup table that includes a gradient of pitch attitude with heading that can be used to determine when the optimal attitude has been obtained. In addition, control effectors (i.e. spoilers, flaps, ailerons, etc) could be used to obtain the optimized hover attitude. The VTOL aircraft will thus be able to adjust its programmed mission to land in changing weather conditions without the need for human interaction or the use of additional sensors. In addition, the VTOL aircraft will have increased operational capability because of its ability to react to adverse wind directions.

Figure 1:
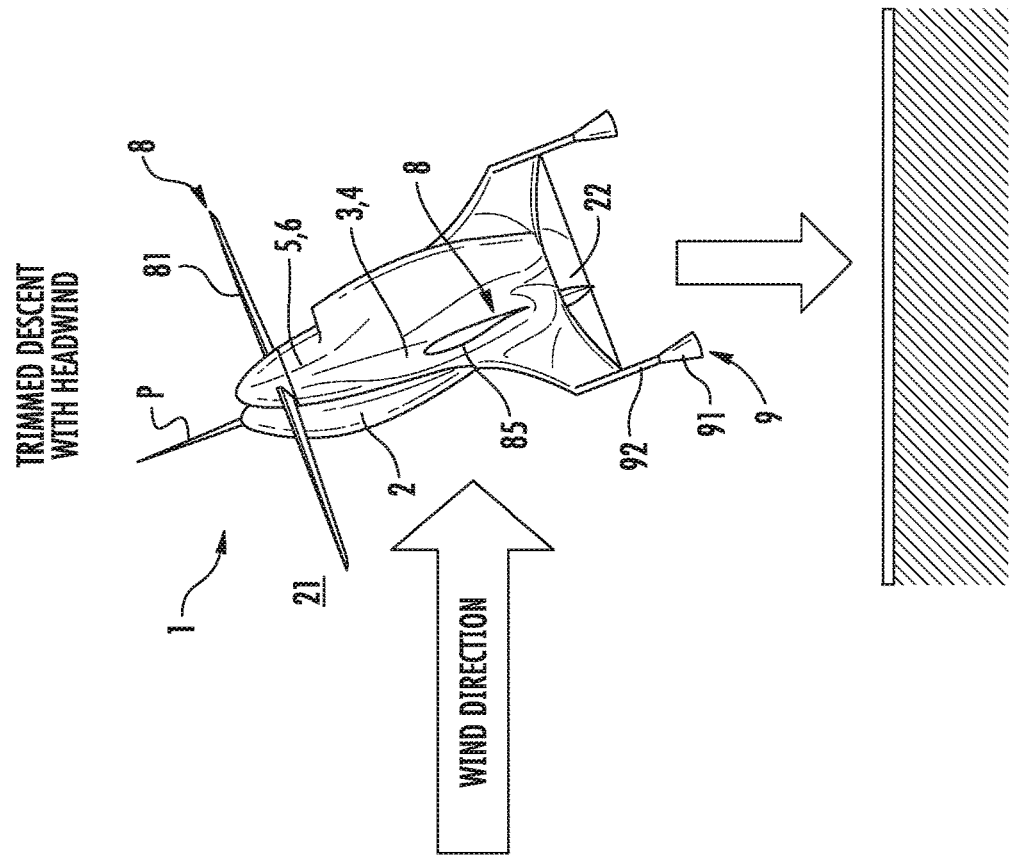
FIG. 1 is a side schematic view of an aircraft landing in a non- or light-wind condition.
Figure 2:
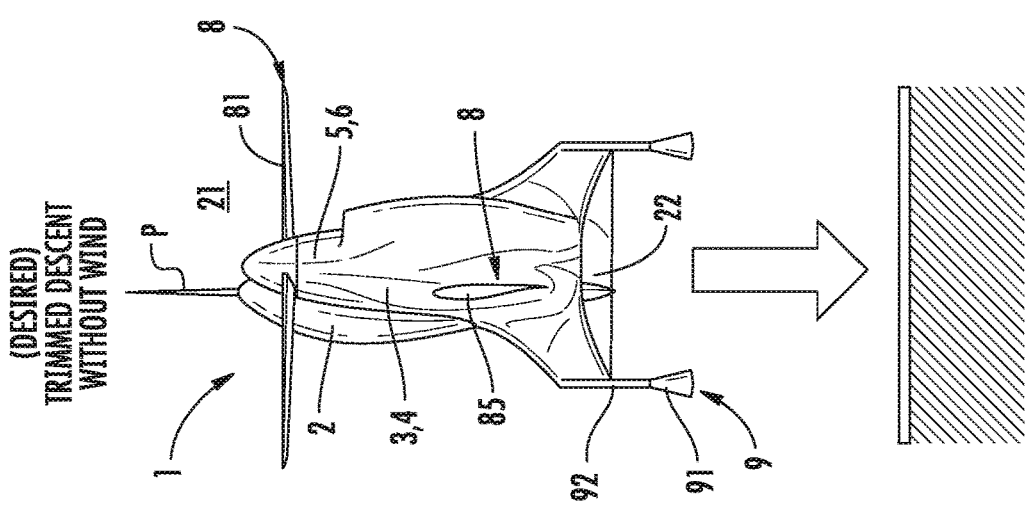
FIG. 2 is a side schematic view of an aircraft landing in a windy condition.
Figure 3:
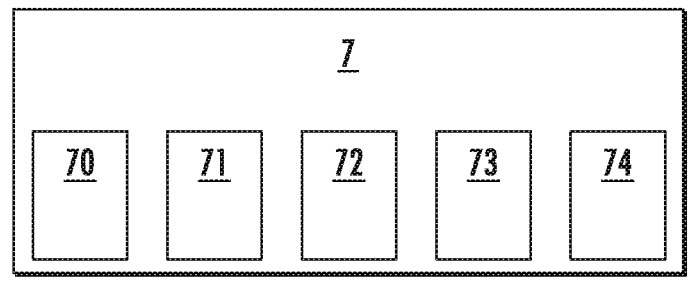
FIG. 3 is a schematic illustration of a flight computer of the aircraft of FIGS. 1 and 2.

With reference to FIGS. 1-3, a vertical take-off and landing (VTOL) aircraft 1 is provided. The VTOL aircraft 1 includes a fuselage 2 that has a nose cone section 21 and a trailing end section 22, a first wing 3 extending outwardly from a first side of the fuselage 2 and a second wing 4 extending outwardly from a second side of the fuselage 2. The first wing 3 and the second wing 4 extending outwardly in opposite directions and are substantially parallel and co-planar such that the first wing 3 and the second wing 4 define a wing plane P. The VTOL aircraft 1 further includes a first prop-rotor 5, which is operably disposed on the first wing 3 to generate thrust, a second prop-rotor 6, which is operably disposed on the second wing 4 to generate thrust, a flight computer 7 and multiple controllable surfaces 8.

The multiple controllable surfaces 8 may include prop-rotor blades 81 of each of the first prop-rotor 5 and the second prop-rotor 6. The prop-rotor blades 81 extend radially outwardly from respective hubs and are drivable to rotate about respective rotational axes to generate the thrust for the VTOL aircraft 1 so that the VTOL aircraft 1 can take off substantially vertically, transition to and execute forward horizontal flight and then transition to and execute safe substantially vertical landings. In accordance with embodiments, the prop-rotor blades 81 are cyclically and collectively controllable to pitch about their respective pitch axes (i.e., the respective long axes of the prop-rotor blades 81). In the case of the cyclic control of the prop-rotor blades 81, application of differential cyclic control commands to the prop-rotor blades 81 of the first prop-rotor 5 as compared to the prop-rotor blades 81 of the second prop-rotor 6 can cause the VTOL aircraft 1 to execute a trim maneuver during a vertical take-off or landing procedure.

The multiple controllable surfaces 8 may further include at least one or more of spoilers, flaps and ailerons (which are generally designated at) 85. The spoilers, flaps and ailerons 85 may be operably disposed at the trailing end section 22 of the fuselage 2, at the trailing edges of the first and second wings 3 and 4 and/or at the trailing ends of the first and second prop-rotors 5 and 6. In any case, the spoilers, flaps and ailerons 85 can be pitched upwardly or downwardly to aerodynamically interact with airflows flowing over the fuselage 2, the first and second wings 3 and 4 and the first and second prop-rotors 5 and 6. That is, during a landing maneuver in particular, the spoilers, flaps and ailerons 85 can be pitched upwardly or downwardly to cause the VTOL aircraft 1 to execute a pitch maneuver by way of the aerodynamic interaction of the spoilers, flaps and ailerons 85 with the airflows (i.e., the downwash from the first and second prop-rotors 5 and 6).

The VTOL aircraft 1 may further include a ground support system 9. The ground support system 9 includes alighting elements 91 on which the VTOL aircraft 1 sits in a grounded condition and alighting element dampening assemblies 92 by which the alighting elements 91 are coupled with, for example, winglets extending out of the wing plane P of the first and second wings 3 and 4. As shown in FIGS. 1 and 2, the alighting element dampening assemblies 92 extend toward the ground with the VTOL aircraft 1 executing a landing operation and include dampeners operably interposed between the alighting elements 91 and the winglets.

The flight computer 7 may be housed in the fuselage 2, at least one of the first and second wings 3 and 4 and/or at least one of the first and second prop-rotors 5 and 6. As shown in FIG. 3, the flight computer 7 may include a first sensor system 70, such as a multi-directional low-speed air data system disposed to sense a predominant direction of local wind conditions, a second sensor system 71, such as a gyroscopic element configured to determine an angle of the wing plane P relative to a vertical plane of the ground, a servo command element 72, a processing unit 73 and a memory unit 74. The servo command element 72 is coupled to the first and second prop-rotors 5 and 6 and to the multiple controllable surfaces 8 and is thus able to control operations of the prop-rotors 5 and 6, to cyclically or collectively control the prop-rotor blades 81 and to pitch the spoilers, flaps and ailerons 85 upwardly and downwardly.

The memory unit 74 has aircraft state and attitude data as well as executable instructions stored thereon. In greater detail, the memory unit 74 may have access to or may provide the processing unit 73 access to a differential value between a target pitch attitude of the wing plane P (e.g., a pitch attitude of 90° relative to flat ground in a landing operation executed in no-wind conditions) and an actual pitch attitude of the wing plane P as determined by the second sensor system 71. In addition, the memory unit 74 may have access to or may provide the processing unit 73 access to aircraft state data that associates the differential value with predominant local wind conditions as determined by the first sensor system 70.

When executed, the executable instructions cause the processing unit 73 to send instructions to the servo command unit 72 that allow the flight computer 7 to generally autonomously control various flight operations of the VTOL aircraft 1. In particular, the executable instructions cause the processing unit 73 to send instructions to the servo command unit 72 in accordance with readings provided by the first and second sensor systems 70 and 71 as well as the aircraft state and attitude data stored on the memory unit 74. The instructions are receivable by the servo command unit 72, which interprets the instructions and accordingly controls the multiple controllable surfaces 8. Such control causes the wing plane P to become positioned in accordance with the predominant local wind direction. That is, the wing plane P is aligned within a predefined range of angles with the predominant local wind direction and may be caused to pitch toward becoming increasingly aligned with the vertical plane of the ground. Alternatively, such control may be used to compensate for the predominant local wind direction.

In operation, the VTOL aircraft 1 as described above, can execute a vertical landing operation in a low- or no-wind condition by hovering above ground as shown in FIG. 1 and decreasing thrust generated by the first and second prop-rotors 5 and 6. In such cases, the alighting element dampening assemblies 92 of the ground support system 9 can correct aircraft verticality to whatever extent the wing plane P might be pitched relative to the ground since the correction would be well within the operating parameters of the alighting element dampening assemblies 92. However, as shown in FIG. 2, where the VTOL aircraft 1 is executing a landing operation in a high-wind condition such that the wing plane P is pitched at a relatively high angle that the alighting element dampening assemblies 92 cannot correct for, the flight computer 7 executes an autonomous hover attitude trim maneuver.

Figure 4:
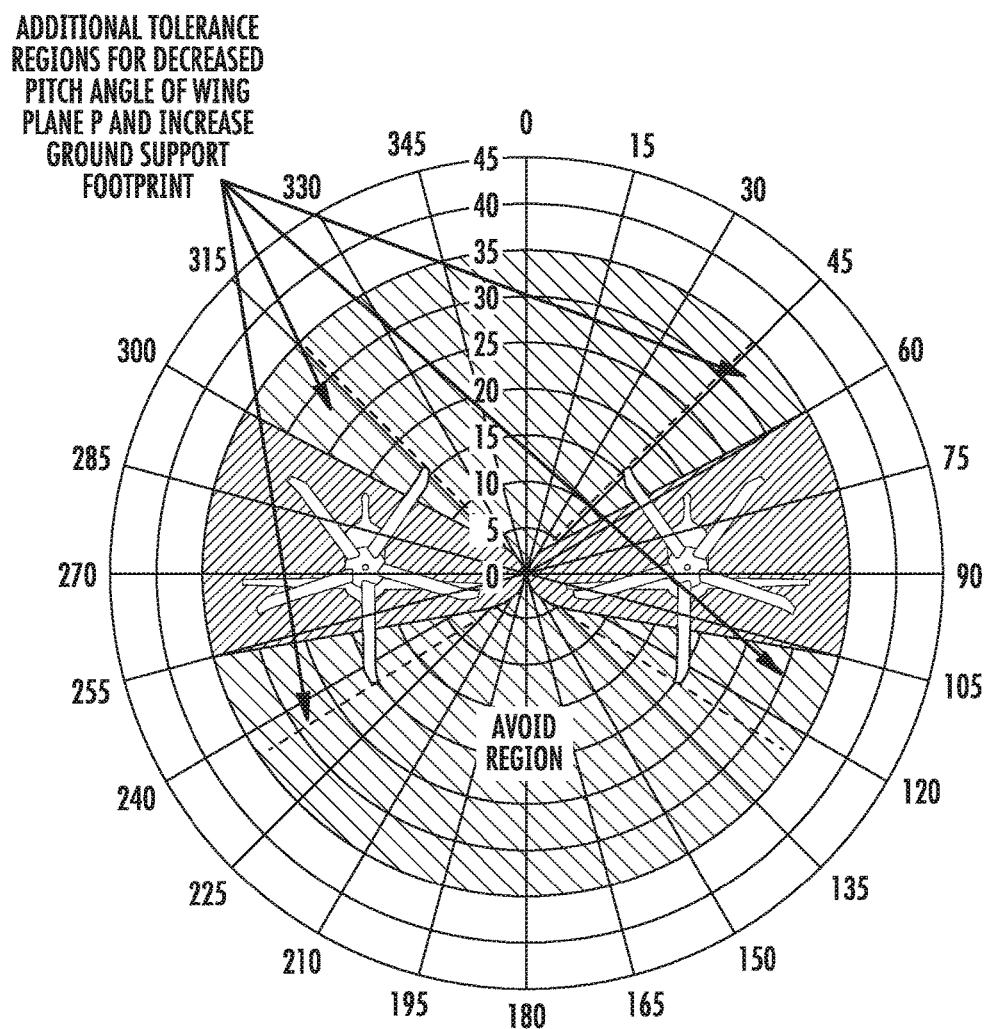
FIG. 4 is a flow diagram illustrating a method of controlling an aircraft in accordance.
Figure 5:
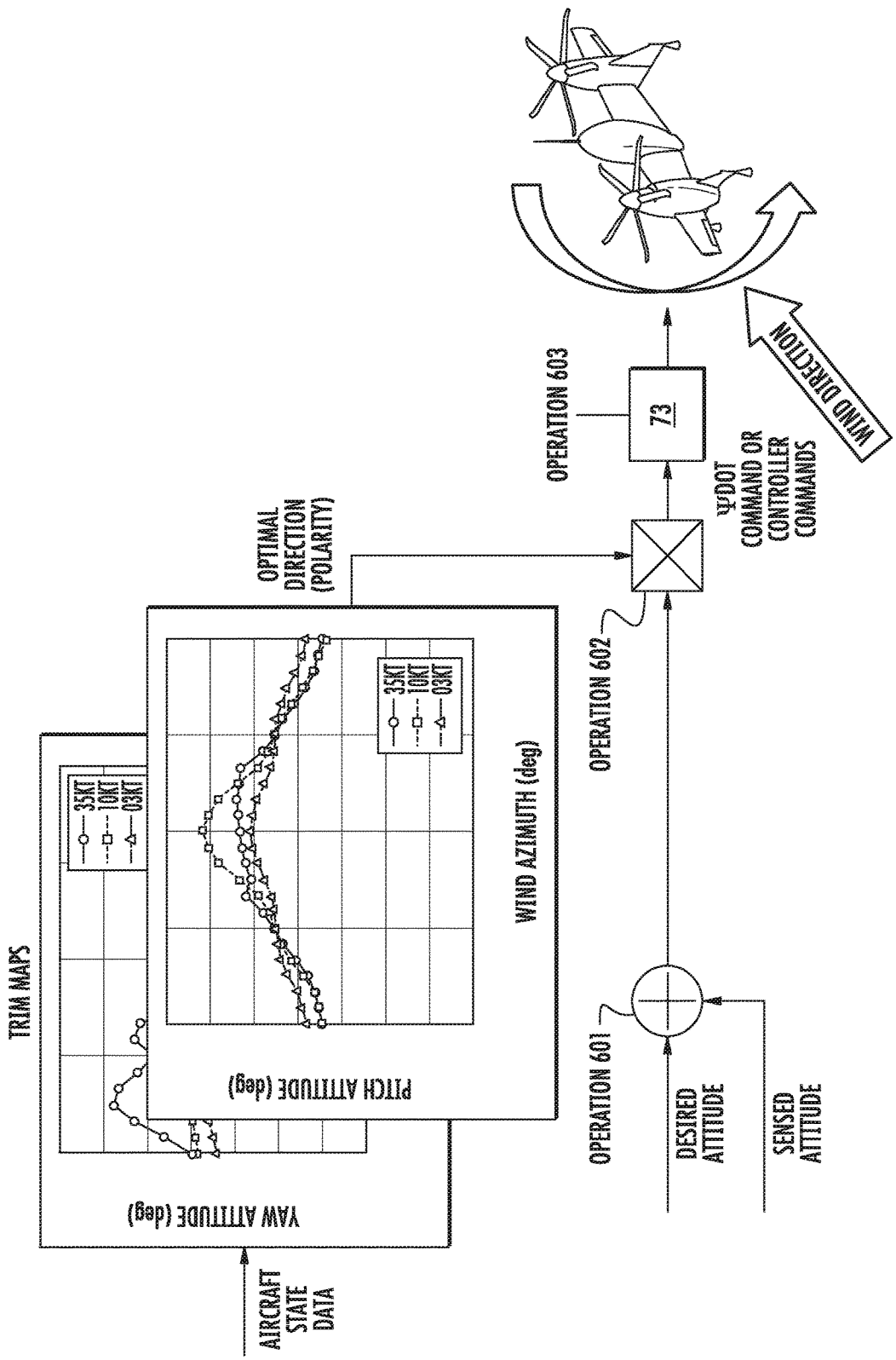
FIG. 5 is a radial depiction of a range of trim angles of an aircraft derived from the method of FIG. 4.

That is, with reference to FIGS. 4 and 5, the processing unit 73 determines the differential value between the target pitch attitude of the wing plane P and the actual pitch attitude of the wing plane P, establishes a range of trim angles of the wing plane P relative to predominant local wind conditions in accordance with the differential value by associating the differential value with the predominant local wind conditions and orients the wing plane P to assume an actual trim angle within the range of the trim angles. In accordance with embodiments, the orientation of the wing plane P is achieved by applying differential cyclic control of the prop-rotor blades 81 of the first and second prop-rotors 5 and 6 to cause the wing plane P in particular and the VTOL aircraft 1 in general to execute a trim maneuver. In accordance with further embodiments, the orientation of the wing plane P may further include decreasing the differential value by controlling the spoilers, flaps and ailerons 85 such that a pitch of the wing plane P becomes more vertical relative to the ground.

The range of the trim angles established by the processing unit 73 may be predefined in accordance with the predominant direction of local wind conditions proximal to the landing site on the ground. In greater detail, the range of the trim angles may assume that an ideal trim angle exists where the wing plane P is parallel with the predominant direction of the local wind conditions plus a predefined safe angular tolerance. Thus, if the predominant direction of the local wind conditions is from 270° to 90°, as shown in FIG. 4, the ideal trim angle of the wing plane P should be aligned with the 270-90° line with a tolerance for achieving a wing plane P inside the 255-60° and 300-105° lines. This 45° tolerance range can be increased by the control of the spoilers, flaps and ailerons 85 such that the pitch of the wing plane P becomes more vertical relative to the ground or by a footprint of the ground support system 9 extending further from the wing plane P to provide greater support for the VTOL aircraft 1 against tipping over.

As shown in FIG. 5, the operations described above are illustrated and show that for a given wind direction, the aircraft state data can be derived and the differential value between the target pitch attitude of the wing plane P and the actual pitch attitude of the wing plane P can be calculated. Here, once the differential value is calculated at operation 601, it can be input into the memory unit 74 along with trim maps derived from the aircraft state data at operation 602. Such inputs are then used by the processing unit 73 to instruct the servo command unit 72 at operation 603 to control the prop-rotor blades 81 and the spoilers, flaps and ailerons 85.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A vertical take-off and landing (VTOL) aircraft, comprising:
   a fuselage, wings extending outwardly from the fuselage to define a wing plane and a prop-rotor operably disposed to generate thrust;
   a flight computer; and
   controllable surfaces disposed on at least one of the fuselage, the wings and the prop-rotor, the controllable surfaces including cyclically controllable prop-rotor blades, and at least one of spoilers, flaps and ailerons, the controllable surfaces being controllable by the flight computer to position the wing plane in accordance with a predominant local wind direction, the flight computer positioning the cyclically controllable prop-rotor blades to turn the wing plane toward an alignment condition and positioning at least one of the spoilers, flaps and ailerons to decrease a differential value between a target pitch attitude and an actual pitch attitude of the wing plane.

2. The VTOL aircraft according to claim 1, wherein the flight computer is configured for executing autonomous flight control.

3. The VTOL aircraft according to claim 1, further comprising:
   alighting elements on which the VTOL aircraft sits in a grounded condition; and
   alighting element dampening assemblies by which the alighting elements are coupled with the wings.

4. The VTOL aircraft according to claim 1, wherein the wings extend outwardly from opposite sides of the fuselage and the prop-rotor comprises:
   a first prop-rotor operably disposed on one of the wings; and
   a second prop-rotor operably disposed on the other of the wings.

5. The VTOL aircraft according to claim 1, wherein the flight computer has access to:
   the differential value between the target pitch attitude and the actual pitch attitude of the wing plane, and state data associating the differential value with predominant local wind conditions.

6. The VTOL aircraft according to claim 1, wherein the controllable surfaces are controllable by the flight computer to orient the wing plane to align with the predominant local wind direction.

7. The VTOL aircraft according to claim 1, wherein the controllable surfaces are controllable by the flight computer to compensate for the predominant local wind direction.

8. The VTOL aircraft according to claim 1, wherein the controllable surfaces are controllable by the flight computer to orient the wing plane to assume an angle within a range of predefined angles with respect to a predominant local wind direction.

9. A method of controlling a vertical take-off and landing (VTOL) aircraft including a fuselage, wings extending outwardly from the fuselage to define a wing plane and a prop-rotor operably disposed to generate thrust, the method comprising:

determining a differential value between target and actual pitch attitudes of the wing plane;

establishing a range of trim angles of the wing plane relative to predominant local wind conditions in accordance with the differential value;

orienting the wing plane to assume a trim angle within the range of the trim angles;

decreasing the differential value by controlling controllable surfaces; and increasing the range of the trim angles in accordance with the decreasing of the differential value.

10. The method according to claim 9, further comprising autonomously controlling a flight of the VTOL aircraft.

11. The method according to claim 9, wherein the establishing of the range of the trim angles comprises associating the differential value with the predominant local wind conditions.

12. The method according to claim 9, wherein the orienting comprises cyclically controlling prop-rotor blades of the prop-rotor.

* * * * *